United States Patent
Kaneko

(10) Patent No.: US 10,657,635 B2
(45) Date of Patent: May 19, 2020

(54) INSPECTION APPARATUS, INSPECTION METHOD AND STORAGE MEDIUM

(71) Applicant: Hitomi Kaneko, Saitama (JP)

(72) Inventor: Hitomi Kaneko, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 15/920,494

(22) Filed: Mar. 14, 2018

(65) Prior Publication Data
US 2018/0268534 A1    Sep. 20, 2018

(30) Foreign Application Priority Data

Mar. 16, 2017   (JP) .................................. 2017-051994
Jan. 25, 2018   (JP) .................................. 2018-010996

(51) Int. Cl.
*G06T 7/00*    (2017.01)
*G06T 7/13*    (2017.01)
*G06T 7/174*    (2017.01)

(52) U.S. Cl.
CPC ............ *G06T 7/0002* (2013.01); *G06T 7/001* (2013.01); *G06T 7/13* (2017.01); *G06T 7/174* (2017.01); *G06T 2207/10008* (2013.01); *G06T 2207/10024* (2013.01); *G06T 2207/30144* (2013.01); *G06T 2207/30176* (2013.01)

(58) Field of Classification Search
CPC ....... B41F 33/0036; G06T 2207/10008; G06T 2207/10024; G06T 2207/30144; G06T 2207/30176; G06T 7/0002; G06T 7/001; G06T 7/13; G06T 7/174; G06T 7/0004; G06T 7/136; G06K 2209/01
See application file for complete search history.

(56) References Cited

U.S. PATENT DOCUMENTS

2012/0121139 A1* 5/2012 Kojima ............... B41F 33/0036
382/112

FOREIGN PATENT DOCUMENTS

| JP | 2012-103225 | 5/2012 |
| JP | 2015-175706 | 10/2015 |

* cited by examiner

*Primary Examiner* — Kenny A Cese
(74) *Attorney, Agent, or Firm* — Oblon, McClelland, Maier & Neustadt, L.L.P.

(57) ABSTRACT

An inspection apparatus includes circuitry to acquire a reference image used for inspecting a printed matter, acquire a scanned image by scanning the printed matter, generate a difference image indicating a difference between the acquired reference image and the acquired scanned image, extract an edge region from the reference image, detect a proximity region located near the edge region, correct an inspection threshold to be applied to a pixel defining the edge region based on a density difference and a distance between the pixel defining the edge region and an influencing pixel set the proximity region, and an inspection threshold to be applied to a pixel defining the proximity region based on a density difference and a distance between the pixel defining the proximity region and an influencing pixel in the edge region, and inspect the printed matter based on the generated difference image and the corrected inspection threshold.

8 Claims, 6 Drawing Sheets

INSPECTION APPARATUS, INSPECTION METHOD AND STORAGE MEDIUM

CROSS-REFERENCE TO RELATED APPLICATION

This application claims priority pursuant to 35 U.S.C. § 119(a) to Japanese Patent Application No. 2017-051994, filed on Mar. 16, 2017, and 2018-010996, filed on Jan. 25, 2018 in the Japan Patent Office, the disclosure of which is incorporated by reference herein in its entirety.

BACKGROUND

Technical Field

This disclosure relates to an inspection apparatus, an inspection method, and a storage medium.

Background Art

Printing operations in production printing require the quality inspection for printed matters to achieve higher quality of the printed matters. For example, an inspection apparatus detects defects existing on a printed matter by comparing a reference image, which is a reference for inspecting the printed matter, and a scanned image generated by optically scanning the printed matter, and inspects quality of the printed matter based on a level of the detected defects.

Since the scanned image is generated by optically scanning the printed matter and then generating electrical signals, a printing error, which may occur when the printed matters are printed, and a scanning error, which may occur when the printed matters are scanned, may cause deviation of scanned information among the scanned images.

Therefore, even when a plurality of scanned images is generated by scanning a plurality of sheets printed with the same contents thereon, a pixel value of one pixel at a position in one scanned image and a pixel value of another pixel at the same position in another scanned image may become different, with which the pixel values at the same position may fluctuate or vary among the scanned images. In particular, the fluctuation of pixel value becomes greater in a region such as an edge region where the image density changes sharply.

If a difference in the edge region of the reference image and the edge region of the scanned image is computed, and then the difference is compared with an inspection threshold to detect defect without considering the above mentioned situation, the defect may not be detected correctly such as a defect may be detected even when no defect occurs, or a defect may not be detected even when the defect actually occurs. In view of this situation, defects in the proximity of the edge region may be detected by adjusting the inspection threshold such as setting a greater inspection threshold. However, when the inspection threshold is set greater without considering the state in the proximity of the edge region (i.e., inspection threshold may be too great), non-allowable level of defects occurring in the proximity of the edge region may not be erroneously detected as the defect, or when the adjustment of the inspection threshold is set too small (i.e., inspection threshold may be too small), allowable level of defects occurring in the proximity of the edge region may be erroneously detected as the defect.

In one conventional technique, the fluctuation of the image density near the edge region is detected by scanning a plurality of scanned images, and adjusting the inspection threshold based on the detected fluctuation of the image density, in which the inspection threshold is adjusted (i.e., set smaller or greater) based on the state near the edge region to improve the inspection accuracy in the proximity of the edge region.

However, in this conventional technique, a number of scanned images are required to detect the fluctuation of the image density around the edge region, and thereby a number of printed matters printed with the same contents are required. Therefore, this conventional technique may not be suitable for inspecting printed matters produced in some printing environment such as a variable printing environment that produces a small number of printed matters having the same contents.

SUMMARY

In one aspect of the present invention, an inspection apparatus is devised. The inspection apparatus includes circuitry to acquire a reference image used as a reference for inspecting a printed matter, acquire a scanned image by scanning the printed matter, generate a difference image indicating a difference between the acquired reference image and the acquired scanned image based on the acquired reference image and the acquired scanned image, extract an edge region from the acquired reference image, detect a proximity region located near the extracted edge region, correct an inspection threshold to a corrected inspection threshold to be applied to a pixel defining the extracted edge region, and an inspection threshold to a corrected inspection threshold to be applied to a pixel defining the detected proximity region, the corrected inspection threshold to be applied to the pixel defining the edge region is calculated based on a density difference between the pixel defining the edge region and each one of influencing pixels set in the proximity region, and a distance between the pixel defining the edge region and each one of the influencing pixels set in the proximity region, and the corrected inspection threshold to be applied to the pixel defining the proximity region is calculated based on a density difference between the pixel defining the proximity region and each one of influencing pixels set in the edge region, and a distance between the pixel defining the proximity region and each one of the influencing pixels set in the edge region, and inspect the printed matter based on the generated difference image and the corrected inspection threshold.

In another aspect of the present invention, a method of inspecting a printed image is devised. The method includes acquiring a reference image used as a reference for inspecting a printed matter, acquiring a scanned image by scanning the printed matter, generating a difference image indicating a difference between the acquired reference image and the acquired scanned image based on the acquired reference image and the acquired scanned image, extracting an edge region from the acquired reference image, detecting a proximity region located near the extracted edge region, correcting an inspection threshold to a corrected inspection threshold to be applied to a pixel defining the extracted edge region, and an inspection threshold to a corrected inspection threshold to be applied to a pixel defining the detected proximity region, the corrected inspection threshold to be applied to the pixel defining the edge region is calculated based on a density difference between the pixel defining the edge region and each one of influencing pixels set in the proximity region, and a distance between the pixel defining the edge region and each one of the influencing pixels set in the proximity region, and the corrected inspection threshold to be applied to the pixel defining the proximity region is calculated based on a density difference between the pixel defining the proximity region and each one of influencing pixels set in the edge region, and a distance between the pixel defining the proximity region and each one of the influencing pixels set in the edge region, and inspecting the printed matter based on the generated difference image and the corrected inspection threshold.

In another aspect of the present invention, a non-transitory storage medium storing one or more instructions that, when executed by one or more processors, cause the one or more processors to execute a method of inspecting a printed image is devised. The method includes acquiring a reference image used as a reference for inspecting a printed matter, acquiring a scanned image by scanning the printed matter, generating a difference image indicating a difference between the acquired reference image and the acquired scanned image based on the acquired reference image and the acquired scanned image, extracting an edge region from the acquired reference image, detecting a proximity region located near the extracted edge region, correcting an inspection threshold to a corrected inspection threshold to be applied to a pixel defining the extracted edge region, and an inspection threshold to a corrected inspection threshold to be applied to a pixel defining the detected proximity region, the corrected inspection threshold to be applied to the pixel defining the edge region is calculated based on a density difference between the pixel defining the edge region and each one of influencing pixels set in the proximity region, and a distance between the pixel defining the edge region and each one of the influencing pixels set in the proximity region, and the corrected inspection threshold to be applied to the pixel defining the proximity region is calculated based on a density difference between the pixel defining the proximity region and each one of influencing pixels set in the edge region, and a distance between the pixel defining the proximity region and each one of the influencing pixels set in the edge region, and inspecting the printed matter based on the generated difference image and the corrected inspection threshold.

BRIEF DESCRIPTION OF THE DRAWINGS

A more complete appreciation of the description and many of the attendant advantages and features thereof can be readily obtained and understood from the following detailed description with reference to the accompanying drawings, wherein.

Figure 1:
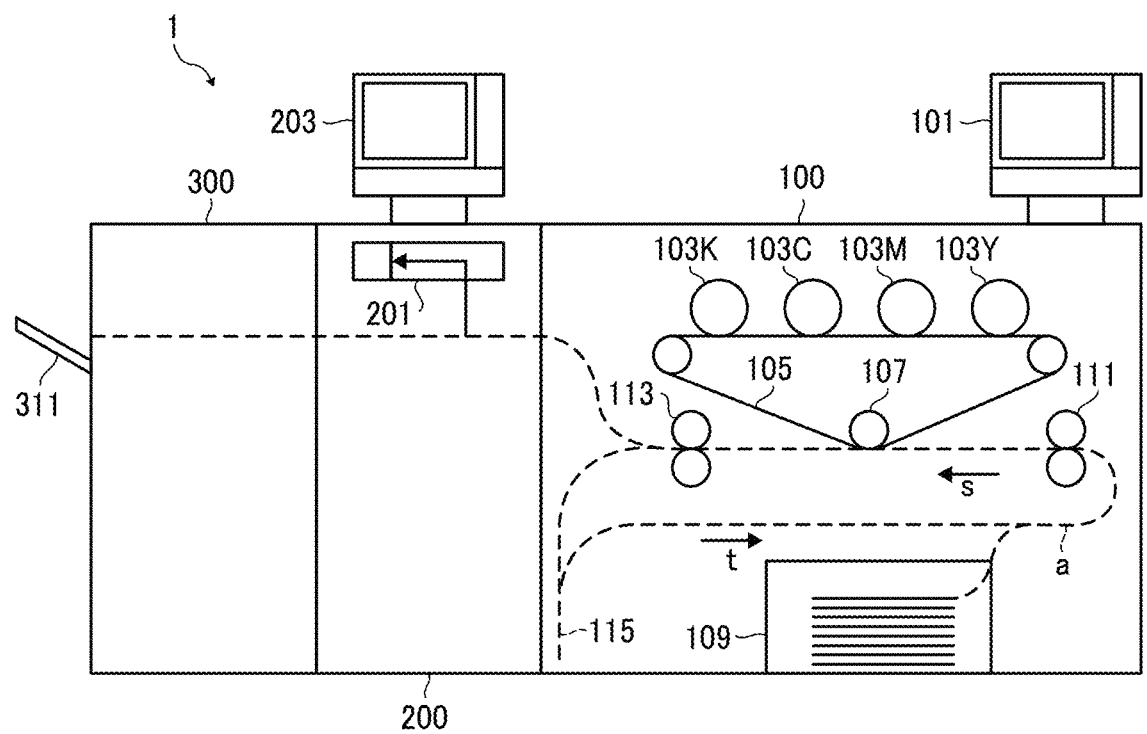
FIG. 1 illustrates an example of a schematic configuration of a print inspection system of an embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of an inspection apparatus, an inspection method, and a storage medium of one or more embodiments of the present invention with reference to the accompanying drawings.

FIG. 1 illustrates an example of a schematic configuration of a print inspection system 1 of an embodiment of the present invention. As illustrated in FIG. 1, the print inspection system 1 includes, for example, a printing apparatus 100, a print inspection apparatus 200, and a stacker 300, in which the printing apparatus 100 is used as one example of image forming apparatuses and the print inspection apparatus 200 is used as one example of inspection apparatuses.

As illustrated in FIG. 1, the printing apparatus 100 includes, for example, an operation panel 101, photoconductor drums 103Y, 103M, 103C, 103K, a transfer belt 105, a secondary transfer roller 107, a sheet feed unit 109, a conveyance roller pair 111, a fixing roller 113, and an inverting path mechanism 115.

The operation panel 101 is an operation/display unit used for inputting various operations to the printing apparatus 100 and displaying various screens.

A toner image is formed on each of the photoconductor drums 103Y, 103M, 103C, 103K by performing an image forming process including a charging process, an exposure process, a development process, a transfer process, and a cleaning process, and then the toner image formed on each of the photoconductor drums 103Y, 103M, 103C, 103K is transferred onto the transfer belt 105. As to the embodiment, a yellow toner image is formed on the photoconductor drum 103Y, a magenta toner image is formed on the photoconductor drum 103M, a cyan toner image is formed on the photoconductor drum 103C, and a black toner image is formed on the photoconductor drum 103K, but not limited thereto.

The transfer belt 105 transports the toner images such as a full-color toner images transferred from the photoconductor drums 103Y, 103M, 103C, and 103K to a secondary transfer position facing the secondary transfer roller 107. As to the embodiment, the yellow toner image is transferred onto the transfer belt 105 at first, and then the magenta toner image, the cyan toner image, and the black toner image are sequentially superposed and transferred onto the transfer belt 105, but not limited thereto.

The sheet feed unit 109 stores a plurality of recording media such sheet by stacking the plurality of recording media, and feeds the recording media one by one. The recording medium is, for example, recording sheets such as paper, but not limited thereto. For example, the recording medium can be coated paper, thick paper, overhead projector (OHP) sheet, plastic film, prepreg and copper foil that can record images thereon.

The conveyance roller pair 111 conveys the recording medium fed from the sheet feed unit 109 along a conveying path "a" in a direction of an arrow "s."

The secondary transfer roller 107 collectively transfers the full-color toner images transported by the transfer belt 105 onto the recording medium conveyed by the conveyance roller pair 111 at the secondary transfer position.

The fixing roller 113 heats and pressurizes the recording medium transferred with the full-color toner images to fix the full-color toner images on the recording medium.

In a case of single-sided printing, the printing apparatus 100 ejects a printed matter, which is the recording medium fixed with the full-color toner images thereon, to the print inspection apparatus 200. By contrast, in a case of double-sided printing, the recording medium fixed with the full-color toner image is transported to the inverting path mechanism 115 in the printing apparatus 100.

The inverting path mechanism 115 reverses the front surface and the back surface of the recording medium by switching back the recording medium, and transports the recording medium in the direction of an arrow "t." The recording medium transported by the inverting path mechanism 115 is then transported by the conveyance roller pair 111 again, and then a full-color toner image is transferred onto the back surface of the recording medium by the secondary transfer roller 107, and the full-color toner image are fixed on the back surface of the recording medium by the fixing roller 113, and then the recording medium is ejected to the print inspection apparatus 200 as the printed matter.

As illustrated in FIG. 1, the print inspection apparatus 200 includes, for example, a scanner 201, and an operation panel 203.

The operation panel 203 is an operation/display unit used for inputting various operations to the print inspection apparatus 200, and displaying various screens. Further, the operation panel 203 can be omitted. When the operation panel 203 is omitted, the operation panel 101 can also serve the function of the operation panel 203, or an externally connected personal computer (PC) can serve the function of the operation panel 203.

The scanner 201 optically scans one face of the printed matter ejected from the printing apparatus 100 to generate an electrical signal. The print inspection apparatus 200 can further include another scanner that optically scans the other face of the printed matter. In this case, another scanner that optically scans the other face of the printed matter may be configured same as the scanner 201. The scanner 201, which optically scans the printed matter, can be implemented by a line sensor or a scanner including an imaging device such as charged-coupled devices (CCD) or complementary metal-oxide-semiconductor (CMOS).

Then, the print inspection apparatus 200 ejects the scanned printed matter to the stacker 300. The stacker 300 includes, for example, a tray 311. The stacker 300 stacks the printed matter ejected from the print inspection apparatus 200 onto the tray 311.

Figure 2:
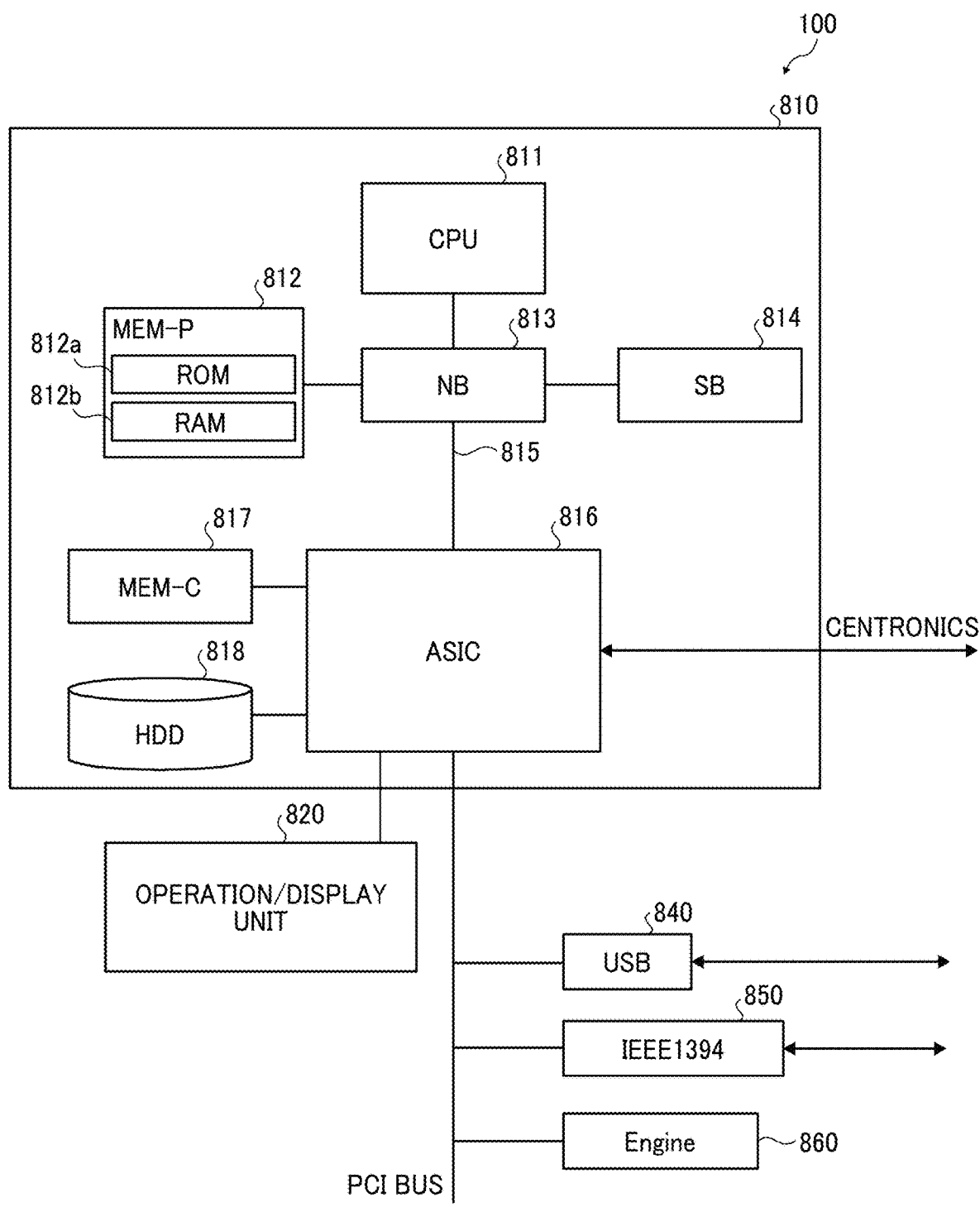
FIG. 2 illustrates an example of a hardware block diagram of a printing apparatus of the embodiment.

FIG. 2 illustrates an example of a hardware block diagram of the printing apparatus 100 of the embodiment. As illustrated in FIG. 2, the printing apparatus 100 includes, for example, a controller 810, and an engine 860 connected with each other by a peripheral component interconnect (PCI) bus. The controller 810 controls the print inspection apparatus 200 entirely. For example, the controller 810 controls drawing, communication, and an input from an operation/display unit 820. The engine 860 is an engine connectable to a PCI bus. For example, the engine 860 includes a scanner engine for a scanner. Further, in addition to an engine unit, the engine 860 includes an image processing unit that performs, for example, error diffusion and gamma conversion.

The controller 810 includes, for example, a central processing unit (CPU) 811, a north bridge (NB) 813, a system memory (MEM-P) 812, a south bridge (SB) 814, a local memory (MEM-C) 817, an application specific integrated circuit (ASIC) 816, and a hard disk drive (HDD) 818, in which the north bridge (NB) 813 and the ASIC 816 are connected with each other by an accelerated graphics port (AGP) bus 815. Further, the MEM-P 812 includes, for example, a read only memory (ROM) 812a, and a random access memory (RAM) 812b.

The CPU 811 controls the print inspection apparatus 200 entirely. The CPU 811 is used with, for example, a chip set having the NB 813, the MEM-P 812 and the SB 814, and the CPU 811 is connected to other devices or apparatuses via the chip set.

The NB 813 is used as a bridge to connect the CPU 811 and the MEM-P 812, the CPU 811 and the SB 814, and the CPU 811 and the AGP bus 815. The NB 813 includes, for example, a memory controller that controls the reading and writing data to the MEM-P 812, a PCI master, and an AGP target.

The MEM-P 812 is a system memory used as a memory for storing programs and data, a memory for loading programs and data, and a drawing memory for a printer. The MEM-P 812 includes the ROM 812a and the RAM 812b. The ROM 812a is a read-only memory used as a memory for storing programs and data. The RAM 812b is used as a memory for loading programs and data, and a drawing memory for a printer where programs and data can be written and read.

The SB 814 is used as a bridge for connecting the NB 813 to PCI devices and peripheral devices. The SB 814 is connected to the NB 813 via a PCI bus, and the PCI bus is also connected to a network interface (I/F) unit.

The ASIC 816 is an integrated circuit (IC) used for image processing having hardware resources for image processing, and the ASIC 816 has a role of a bridge connecting the AGP bus 815, the PCI bus, the HDD 818, and the MEM-C 817. The ASIC 816 includes a PCI target and an AGP master, an arbiter (ARB) used as the core of the ASIC 816, a memory controller for controlling the MEM-C 817, a plurality of direct memory access controllers (DMACs) for performing rotation of image data or the like by a hardware logic or the like, and a PCI unit for performing data transfer with the engine 860 via a PCI bus. The ASIC 816 is connected to a universal serial bus (USB) 840, and an Institute of Electrical and Electronics Engineers (IEEE) 1384 interface 850 via a PCI bus. The operation/display unit 820 is connected to the ASIC 816 directly.

The MEM-C 817 is a local memory used as a copy image buffer and a code buffer. The HDD 818 is a storage for accumulating or storing image data, programs, font data, and forms or the like.

The AGP bus 815 is a bus interface for a graphics accelerator card proposed for enhancing a graphics processing speed, and the AGP bus 815 accesses the MEM-P 812 directly with high throughput to enhance the processing speed of the graphics accelerator card speed.

Figure 3:
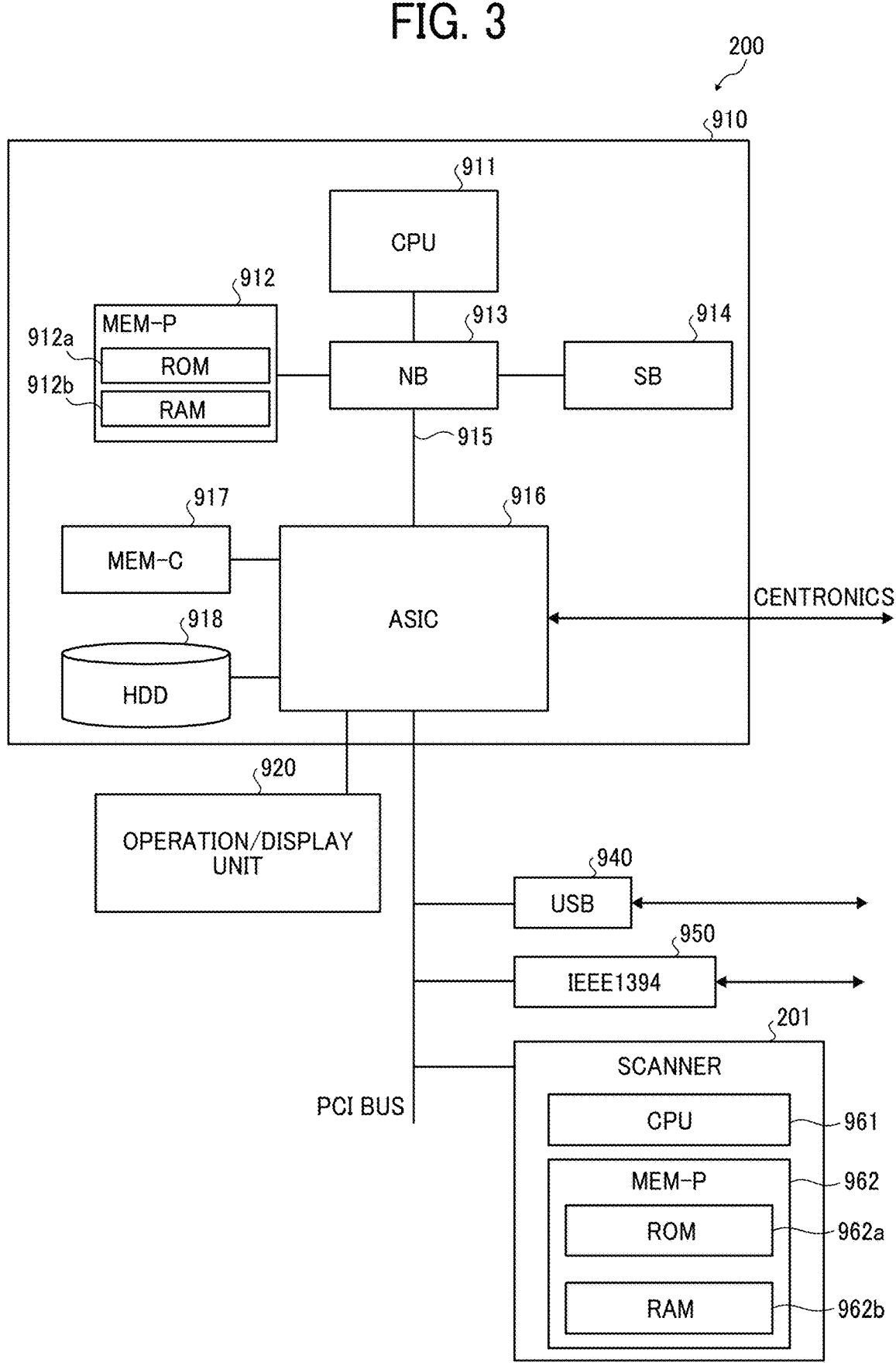
FIG. 3 illustrates an example of a hardware block diagram of a print inspection apparatus of the embodiment.

FIG. 3 illustrates an example of a hardware block diagram of the print inspection apparatus 200 of the embodiment. As illustrated in FIG. 3, the print inspection apparatus 200 includes, for example, a controller 910, and a CPU 961 of the scanner 201 connected with each other by a peripheral component interconnect (PCI) bus. The controller 910 controls the print inspection apparatus 200 entirely. For example, the controller 910 controls drawing, communication, and an input from an operation/display unit 920. The scanner 201 includes, for example, the CPU 961 and a memory (MEM-P) 962. The memory (MEM-P) 962 includes, for example, a ROM 962a and a RAM 962b. The CPU 961 reads programs and data stored in the ROM 962a, and loads the read programs and data on the RAM 962b. If the scanner 201 does not include the CPU 961, ROM 962a, and RAM 962b, the CPU 911 may implement the function of the print inspection apparatus 200.

The controller 910 includes, for example, a central processing unit (CPU) 911, a north bridge (NB) 913, a system memory (MEM-P) 912, a south bridge (SB) 914, a local memory (MEM-C) 917, an application specific integrated circuit (ASIC) 916, and a hard disk drive (HDD) 918, in which the north bridge (NB) 913 and the ASIC 916 are connected with each other by an accelerated graphics port (AGP) bus 915. Further, the MEM-P 912 includes, for example, a read only memory (ROM) 912a, and a random access memory (RAM) 912b.

The CPU 911 controls the print inspection apparatus 200 entirely. The CPU 911 is used with, for example, a chip set having the NB 913, the MEM-P 912 and the SB 914, and the CPU 911 is connected to other devices or apparatuses via the chip set.

The NB 913 is used as a bridge to connect the CPU 911 and the MEM-P 912, the CPU 911 and the SB 914, and the CPU 911 and the AGP bus 915. The NB 913 includes, for example, a memory controller that controls the reading and writing data to MEM-P 912, a PCI master, and an AGP target.

The MEM-P 912 is a system memory used as a memory for storing programs and data, a memory for loading programs and data, and a drawing memory for a printer. The MEM-P 912 includes the ROM 912a and the RAM 912b. The ROM 912a is a read-only memory used as a memory for storing programs and data. The RAM 912b is used as a memory for loading programs and data, and a drawing memory for a printer where programs and data can be written and read.

The SB 914 is used as a bridge for connecting the NB 913 to PCI devices and peripheral devices. The SB 914 is connected to the NB 913 via a PCI bus, and the PCI bus is also connected to a network interface (I/F) unit.

The ASIC 916 is an integrated circuit (IC) used for image processing having hardware resources for image processing, and the ASIC 916 has a role of a bridge connecting the AGP bus 915, the PCI bus, the HDD 918, and the MEM-C 917. The ASIC 916 includes a PCI target and an AGP master, an arbiter (ARB) used as the core of the ASIC 916, a memory controller for controlling the MEM-C 917, a plurality of direct memory access controllers (DMACs) for performing rotation of image data or the like by a hardware logic or the like, and a PCI unit for performing data transfer with the CPU 961 via a PCI bus. The ASIC 916 is connected to a universal serial bus (USB) 940, and an Institute of Electrical and Electronics Engineers (IEEE) 1394 interface 950 via a PCI bus. The operation/display unit 920 is connected to the ASIC 916 directly.

The MEM-C 917 is a local memory used as a copy image buffer and a code buffer. The HDD 918 is a storage for accumulating or storing image data, programs, font data, and forms or the like.

The AGP bus 915 is a bus interface for a graphics accelerator card proposed for enhancing a graphics processing speed, and the AGP bus 915 accesses the MEM-P 912 directly with high throughput to enhance the processing speed of the graphics accelerator card speed.

In the embodiment, the hardware configuration of the print inspection apparatus 200 is described based on an assumption that the print inspection apparatus 200 is manufactured as the dedicated print inspection apparatus, but not limited thereto. For example, when the print inspection apparatus 200 is implemented by a general-purpose computer such as a personal computer (PC), the print inspection apparatus 200 can be implemented by using a hardware configuration of the general-purpose computer.

Figure 4:
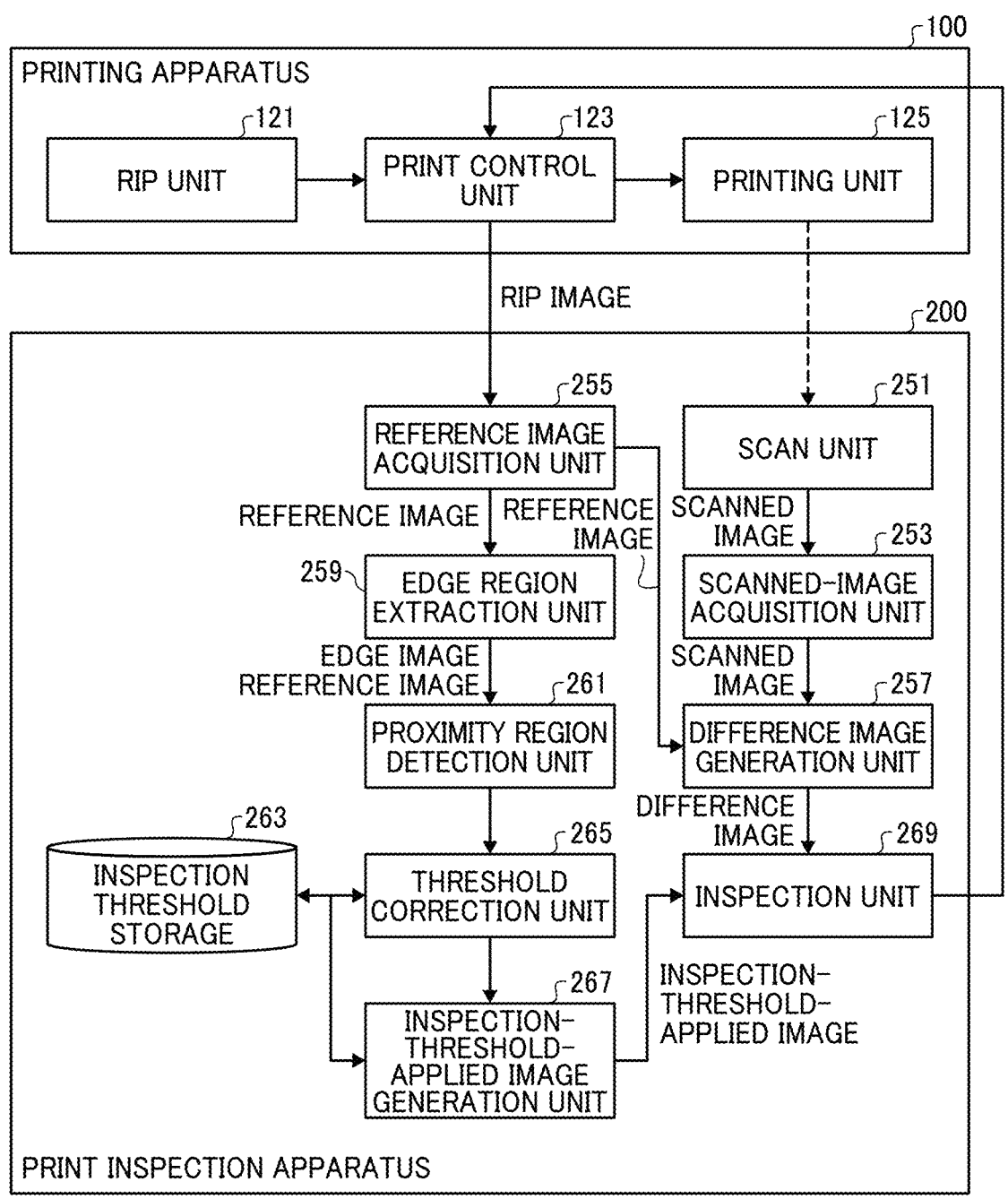
FIG. 4 illustrates an example of a functional block diagram of the printing apparatus and the printing apparatus of the embodiment.

FIG. 4 illustrates an example of a functional block diagram of the printing apparatus 100 and the print inspection apparatus 200 of the embodiment. As illustrated in FIG. 4, the printing apparatus 100 includes, for example, a raster image processor (RIP) unit 121, a print control unit 123, and a printing unit 125. As illustrated in FIG. 4, the print inspection apparatus 200 includes, for example, a scan unit 251, a scanned-image acquisition unit 253, a reference image acquisition unit 255, a difference image generation unit 257, an edge region extraction unit 259, a proximity region detection unit 261, an inspection threshold storage 263, a threshold correction unit 265, an inspection-threshold-applied image generation unit 267, and an inspection unit 269.

As to the embodiment, it is assumed that the printing apparatus 100 includes the RIP unit 121, but not limited thereto. For example, an apparatus such as a digital front end (DFE), different from the printing apparatus 100, can include the RIP unit 121.

As to the embodiment, it is assumed that the printing apparatus 100 and the print inspection apparatus 200 are connected with each other by a local interface such as a universal serial bus (USB) and a peripheral component interconnect express (PCIe), but the connection between the printing apparatus 100 and the print inspection apparatus 200 is not limited thereto.

The RIP unit 121 and the print control unit 123 can be implemented by, for example, the CPU 811 and the system memory (MEM-P) 812. The printing unit 125 can be implemented by, for example, the photoconductor drums 103Y, 103M, 103C, 103K, the transfer belt 105, the secondary transfer roller 107, and the fixing roller 113, but not limited thereto. As to the embodiment, images are printed by using the electrophotography method, but images can be printed by using any methods such as the inkjet method.

The scan unit 251 corresponds to the scanner 201 (FIG. 1), and can be implemented by, for example, by using an engine that is implemented by executing programs stored in the ROM 962a by the CPU 961 or CPU 911. The scanned-image acquisition unit 253, the reference image acquisition unit 255, the edge region extraction unit 259, the proximity region detection unit 261, the threshold correction unit 265, and the inspection-threshold-applied image generation unit 267 can be implemented, for example, by the CPU 911 and the MEM-P 912. The inspection threshold storage 263 can be implemented by, for example, the HDD 918. The difference image generation unit 257 and the inspection unit 269 can be implemented by, for example, the CPU 911 and the MEM-P 912, by the ASIC 916, or by a combination of the CPU 911, the MEM-P 912, and the ASIC 916.

When the RIP unit 121 receives target print data from an external apparatus such as a host apparatus, the RIP unit 121 performs the RIP processing on the received target print data, and generates a RIP image as a target drawing image or target image. As to the embodiment, the target print data includes, for example, data described in page description language (PDL) such as PostScript (registered trademark) and image data defined by tagged image file format (TIFF), but not limited thereto.

Further, as to the embodiment, the RIP image is RIP image data expressed by cyan, magenta, yellow, and black (CMYK) color, and it is assumed that the RIP image data has an image resolution of 600 dot per inch (dpi), but not limited thereto.

The print control unit 123 transmits the RIP image generated by the RIP unit 121 to the print inspection apparatus 200, and also to the printing unit 125. Further, based on an inspection result transmitted from the print inspection apparatus 200 as feedback information to the print control unit 123, for example, the print control unit 123 instructs the stacker 300 to designate an ejection tray of a printed matter which did not pass the quality inspection, puts marking on the printed matter which did not pass the quality inspection, and instructs the printing unit 125 to perform a new printing operation to output a printed matter correctly.

The printing unit 125 executes a printing process such as an image forming process to print the RIP image on a recording medium, with which a printed matter, which is the recording medium printed with the target drawing image thereon, is generated.

The scan unit 251 scans the printed matter generated by the printing unit 125 to generate a scanned image, in which the scanned image is generated by scanning the recording medium printed with an image thereon. As to the embodiment, it is assumed that the scanned image is formed of a plurality of pixels, in which each pixel represents image data of any one of red, green or blue (RGB) having an image resolution of 200 dot per inch (dpi), but the formation of the scanned image is not limited thereto.

The scanned-image acquisition unit 253 acquires the scanned image generated by the scan unit 251.

The reference image acquisition unit 255 acquires a reference image (i.e., master image) used as an inspection reference for inspecting the printed matter generated by the printing apparatus 100. Specifically, the reference image acquisition unit 255 acquires the RIP image transmitted from the printing apparatus 100 as the target drawing image, and generates and acquire the reference image (i.e., master image) based on the acquired RIP image, in which the reference image is used as an inspection reference for inspecting the printed matter. More specifically, the reference image acquisition unit 255 performs, for example, the resolution conversion processing, color conversion processing, and reference point setting processing on the acquired RIP image to generate the reference image.

In the resolution conversion processing, the reference image acquisition unit 255 converts the image resolution of the RIP image from 600 dpi to 200 dpi. In the color conversion processing, the reference image acquisition unit 255 converts a color space of the RIP image, having applied with the above described resolution conversion processing, from the CMYK color space to the RGB color space. More specifically, the reference image acquisition unit 255 converts the color space of the RIP image from the CMYK color space to the RGB color space by using a lookup table (LUT), which correlates or associates colors expressed by the CMYK color space (i.e., each color is expressed by a combination of a value of each of CMYK color channels) and colors expressed by the RGB color space (i.e., each color is expressed by a combination of a value of each of RGB color channels) as color conversion information. Further, the color conversion information can be stored in, for example, the HDD 918.

In the reference point setting processing, the reference image acquisition unit 255 sets a reference point on the RIP image applied with the color conversion processing. The reference point is a feature point that serves as a reference for aligning or matching a position on the reference image and a position on the scanned image.

By performing the above described processing, the reference image acquisition unit 255 generates the reference image formed of pixels defined by the RGB color space and having the image resolution of 200 dpi from the RIP image formed of pixels defined by the CMYK space and having the image resolution of 600 dpi. However, the method of generating the reference image is not limited to the above method, and the processing and conversion values used for generating the reference image can be appropriately modified depending on the image format such as gradation, color space, and image resolution.

The difference image generation unit 257 generates a difference image indicating a difference between the scanned image acquired by the scanned-image acquisition unit 253 and the reference image acquired by the reference image acquisition unit 255. More specifically, the difference image generation unit 257 extracts one or more feature points from the reference image generated by the reference image acquisition unit 255, identifies one or more points on the scanned image acquired by the scanned-image acquisition unit 253 that correspond to the one or more extracted feature points on the reference image, calculates a positional deviation amount between the one or more feature points on the reference image and the corresponding one or more points identified on the scanned image, and then performs the position matching between the reference image and the scanned image based on the calculated positional deviation amount. Then, after performing the position matching or alignment of the reference image and the scanned image, the difference image generation unit 257 compares the reference image and the scanned image pixel by pixel, calculates a difference value of a pixel value indicated by each RGB color for each pixel, and generates the difference image formed of the difference value of pixel value calculated for each pixel.

The edge region extraction unit 259 extracts an edge region from the reference image acquired by the reference image acquisition unit 255. The edge region is a region defined by an edge portion extracted from the reference image. More specifically, the edge region extraction unit 259 performs the filtering processing such as Laplacian filtering on the reference image, performs an edge determination by applying a threshold to generate an edge image extracted from the reference image. The edge image represents an edge region on the reference image.

The proximity region detection unit 261 detects a proximity region located near the edge region extracted by the edge region extraction unit 259. Specifically, the proximity region detection unit 261 detects the proximity region based on one or more pixels defining the edge region. For example, the proximity region detection unit 261 detects the proximity region by performing the expansion processing (e.g., dilation) and filtering processing on the edge image generated by the edge region extraction unit 259. Then, the proximity region detection unit 261 detects a region formed of pixels located within, for example, a two-pixel range surrounding the edge region as the proximity region, in which some pixels of the proximity region are adjacent to pixels of the edge region. The pixel range defining the proximity region can be adjusted as needed.

The inspection threshold storage 263 stores one or more inspection thresholds used for inspecting the printed matter generated by the printing apparatus 100.

The threshold correction unit 265 corrects the one or more inspection thresholds stored in the inspection threshold storage 263 to apply the corrected inspection thresholds to the pixels defining the proximity region or the pixels defining the edge region. Specifically, an inspection threshold to be applied to one pixel defining the edge region is corrected based on the density difference between the one pixel defining the edge region and each one of influencing pixels set in the proximity region, and the distance between the one pixel defining the edge region and each one of the influencing pixels set in the proximity region. Further, an inspection threshold to be applied to one pixel defining the proximity region is corrected based on the density difference between the one pixel defining the proximity region and each one of influencing pixels set in the edge region, and the distance between the one pixel defining the proximity region and each one of the influencing pixels set in the edge region. In this description, the influencing pixel indicates a pixel that is used to correct an inspection threshold to be applied to one pixel defining the edge region or proximity region, in which the one pixel defining the edge region or proximity region and the corresponding influencing pixel may exist at opposed positions. In this description, the one pixel defining the edge region means any one of pixels defining the edge region, and the one pixel defining the proximity region means any one of pixels defining the proximity region.

In the embodiment, the influencing pixel set in the edge region opposite to the one pixel defining the proximity region is one of pixels in the edge region that is adjacent to a pixel defining the edge region and used as a source of detecting the one pixel defining the proximity region. The influencing pixel is set in the edge region at a position opposite to a position of the one pixel defining the proximity region. Further, the influencing pixel set in the proximity region opposite to the one pixel defining the edge region is one of pixels in the proximity region, which is adjacent to pixels defining the edge region and having the greatest density difference with respect to the one pixel defining the edge region. As above described, the influencing pixel set in the proximity region may affect the one pixel defining the edge region, and the influencing pixel set in the edge region may affect the one pixel defining the proximity region. The influencing pixel may be also referred to as a referred pixel because the influencing pixel is referred when correcting the inspection threshold to be applied to the one pixel defining the edge region or the one pixel defining the proximity region.

Hereinafter, a method for correcting the inspection threshold set for pixels defining the edge region and pixels defining the proximity region is described. Hereinafter, a description is given of a method of correcting the inspection threshold used for the pixels defining the proximity region with reference to FIG. 5.

Figure 5:
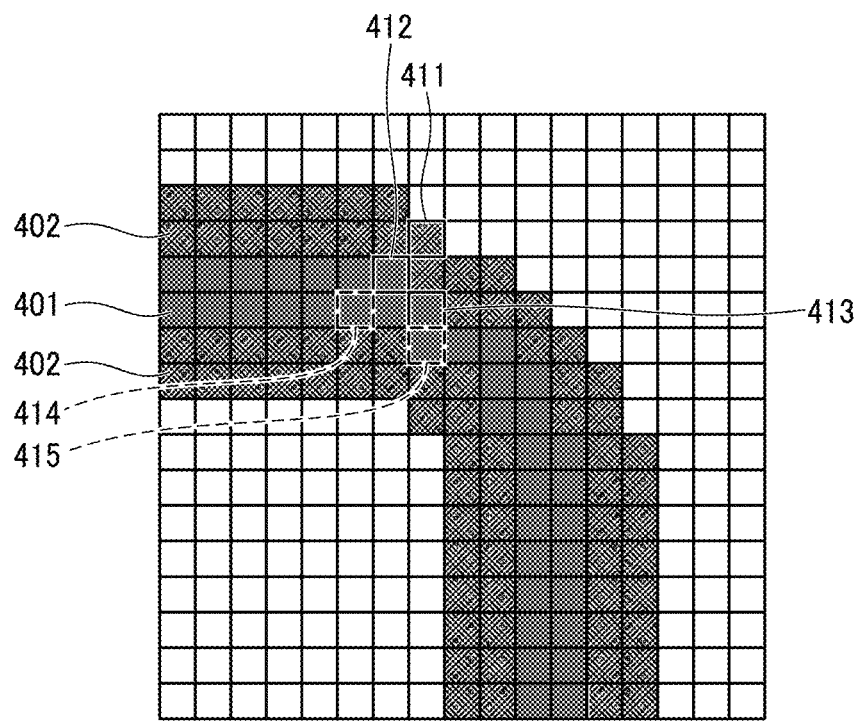
FIG. 5 illustrates an example of an edge region and a proximity region on an edge image of the embodiment.

FIG. 5 illustrates an example of an edge region and a proximity region on an edge image of the embodiment. In an example of FIG. 5, the edge image includes an edge region 401, and a proximity region 402 defined by pixels located, for example, within a two-pixel range from the edge region 401.

Hereinafter, a description is given of a method of correcting the inspection threshold to be applied to a pixel 411 defining the proximity region 402 with reference to FIG. 5.

First, the threshold correction unit 265 identifies pixels 412 and 413 in the edge region 401 as the pixels defining the edge region 401 and as the source for detecting the pixel 411 defining or forming the proximity region 402. In an example case of FIG. 5, the proximity region 402 is set as a region (i.e., cross-hatched portion in FIG. 5) defined by the pixels located within the two-pixel range from the edge region 401 (i.e., solid portion in FIG. 5). In this case, one or more pixels defining the edge region 401 and located within the two-pixel range counted from the pixel 411 becomes the source for detecting the pixel 411 defining the proximity region 402. In an example case of FIG. 5, it is assumed that two pixels 412 and 413 in the edge region 401 becomes the source for detecting the pixel 411 defining the proximity region 402.

Then, the threshold correction unit 265 identifies one or more influencing pixels in the edge region 401 with respect to the pixel 411 defining the proximity region 402. For example, the threshold correction unit 265 identifies a pixel 414 in the edge region 401 existing at a position opposite to a position of the pixel 411 defining the proximity region 402 via the pixel 412 as the influencing pixel, in which the pixel 414, existing opposite to the pixel 411, is one of the pixels existing adjacently to the pixel 412. Further, the threshold correction unit 265 identifies a pixel 415 in the edge region 401 existing at another position opposite to the position of the pixel 411 defining the proximity region 402 via the pixel 413 as the influencing pixel, in which the pixel 415, existing opposite to the pixel 411, is one of the pixels existing adjacently to the pixel 413.

Then, the threshold correction unit 265 refers to the reference image to extract the density of the pixel 411, the density of the pixel 414, and the density of the pixel 415 on the reference image, and further, the threshold correction unit 265 refers to the reference image to calculate the distance between the pixel 411 and the pixel 414 on the reference image, and the distance between the pixel 411 and the pixel 415 on the reference image.

Then, the threshold correction unit 265 applies these values into the following formula (1) as parameters to correct the inspection threshold to be used for the inspection, and obtains a corrected inspection threshold to be applied to the pixel 411 on the difference image.

$$Sc = So + \sum_{i=0} \frac{\sqrt{(Ei-N)^2} \times A}{(Di \times B)} \times C \quad (1)$$

The formula (1) includes the following terms: "Sc" indicates an inspection threshold after performing the correction (i.e., corrected inspection threshold). "So" indicates an inspection threshold before performing the correction (e.g., pre-set inspection threshold). "N" indicates the density of the pixel to be applied with the corrected inspection threshold (e.g., density of pixel 411 in FIG. 5). "Ei" indicates the density of one or more influencing pixels (e.g., density of pixels 414 and 415 in FIG. 5). "Di" indicates the distance between the pixel (e.g., pixel 411) to be applied with the inspection threshold, and one or more influencing pixels (e.g., distance between pixels 411 and 414, distance between pixels 411 and 415 in FIG. 5). "A" indicates a coefficient for the density difference. "B" indicates a coefficient for the distance. "C" indicates a coefficient for the number of the influencing pixels existing in the edge region 401, which may affect the pixel in the proximity region 402 to be applied with the inspection threshold. Although it is assumed that values of the coefficients A, B, and C are empirically determined in the embodiment, the method for determining the values of the coefficients A, B and C is not limited thereto.

Then, the threshold correction unit 265 performs the above-described processing performed for the pixel 411 defining the proximity region 402 to each of other pixels defining the proximity region 402 to obtain a corrected inspection threshold to be applied to each one of the pixels defining the proximity region 402.

Similarly, the inspection threshold to be applied to the pixels defining the edge region 401 can be obtained by performing the above described method, in which one or more influencing pixels, set in the proximity region 402 opposite to one pixel defining the edge region 401, are one or more pixels in the proximity region 402 adjacent to the pixels defining the edge region 401 and having the greatest density difference with respect to the one pixel defining the edge region 401.

Then, the threshold correction unit 265 performs the above described processing on each of the pixels defining the edge region 401 to obtain a corrected inspection threshold to be applied to each of the pixels defining the edge region 401.

As indicated in the above formula (1), the corrected inspection threshold to be applied to the pixels defining the edge region is proportional to the density difference between the pixels defining the edge region and each one of the influencing pixels set in the proximity region, and is also inversely proportional to the distance between the pixels defining the edge region and each one of the influencing pixels set in the proximity region.

Further, the corrected inspection threshold to be applied to the pixels defining the proximity region is proportional to the density difference between the pixels defining the proximity region and each one of the influencing pixels set in the edge region, and is also inversely proportional to the distance between the pixels defining the proximity region and each one of the influencing pixels set in the edge region.

The inspection-threshold-applied image generation unit 267 applies the inspection threshold (e.g., pre-set inspection threshold) stored in the inspection threshold storage 263 for pixels defining a region other than the edge region and the proximity region, and applies the inspection threshold corrected by the threshold correction unit 265 (i.e., corrected inspection threshold) to the pixels defining the edge region or the pixels defining the proximity region to generate an inspection-threshold-applied image.

Figure 6:
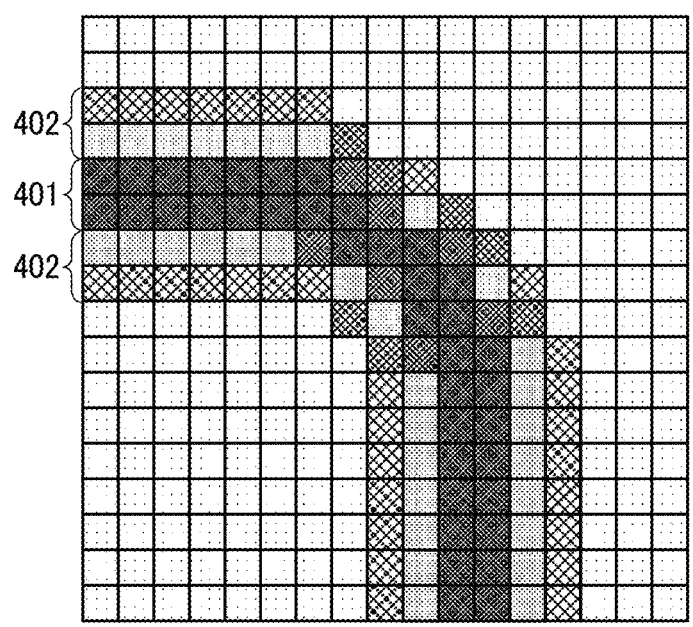
FIG. 6 illustrates an example of an inspection-threshold-applied image of the embodiment.

FIG. 6 illustrates an example of an inspection-threshold-applied image of the embodiment. As to the inspection-threshold-applied image illustrated in FIG. 6, each one of pixels defining the region other than the edge region 401 and the proximity region 402 in FIG. 5 is applied with the "So" (e.g., pre-set inspection threshold) indicated in the formula (1), and each one of pixels defining the edge region 401 and each one of pixels defining the proximity region 402 in FIG. 5 is applied with the corrected inspection threshold "Sc" obtained by calculating the formula (1).

The inspection unit 269 inspects the printed matter generated by the printing apparatus 100 based on the difference image generated by the difference image generation unit 257 and the inspection threshold corrected by the threshold correction unit 265. Specifically, the inspection unit 269 inspects the printed matter based on the difference image generated by the difference image generation unit 257, and the inspection-threshold-applied image generated by the inspection-threshold-applied image generation unit 267. More specifically, the inspection unit 269 compares the difference image and the inspection-threshold-applied image pixel by pixel by inspecting or checking a difference value of the density of pixels, pixel by pixel, to determine the level of density defect of the printed matter. For example, a portion (i.e., pixel group) where the difference value becomes greater than a given threshold, and a greater area portion (i.e., pixel group) having a given difference value or more may be determined as the density defect of the printed matter.

Then, the inspection unit 269 stores an inspection result such as a position and a type of the density defect, an inspected image, and the reference image in a memory such as the HDD 918 by associating these data with each other, and then transmits the inspection result to the printing apparatus 100 as feedback information.

Figure 7:
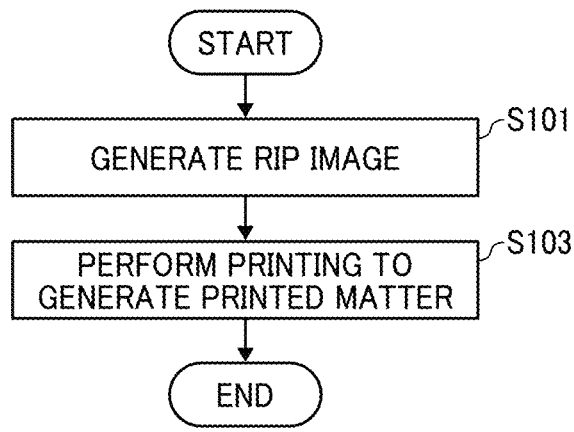
FIG. 7 illustrates an example of a flowchart of the steps of a process of generating a printed image by using the printing apparatus of the embodiment.

FIG. 7 illustrates an example of a flowchart of the steps of a process of generating a printed image by the printing apparatus 100 of the embodiment.

First, when the RIP unit 121 receives target print data from an external apparatus such as a host apparatus, the RIP unit 121 performs the RIP processing on the received target print data, and generates a RIP image as a target drawing image or target image (step S101).

Then, the print control unit 123 transmits the RIP image generated by the RIP unit 121 to the print inspection apparatus 200, and also to the printing unit 125. The printing unit 125 executes a printing process such as an image forming process to print the RIP image on a recording medium, with which a printed matter such as the recording medium printed with the target drawing image thereon is generated (step S103).

Figure 8:
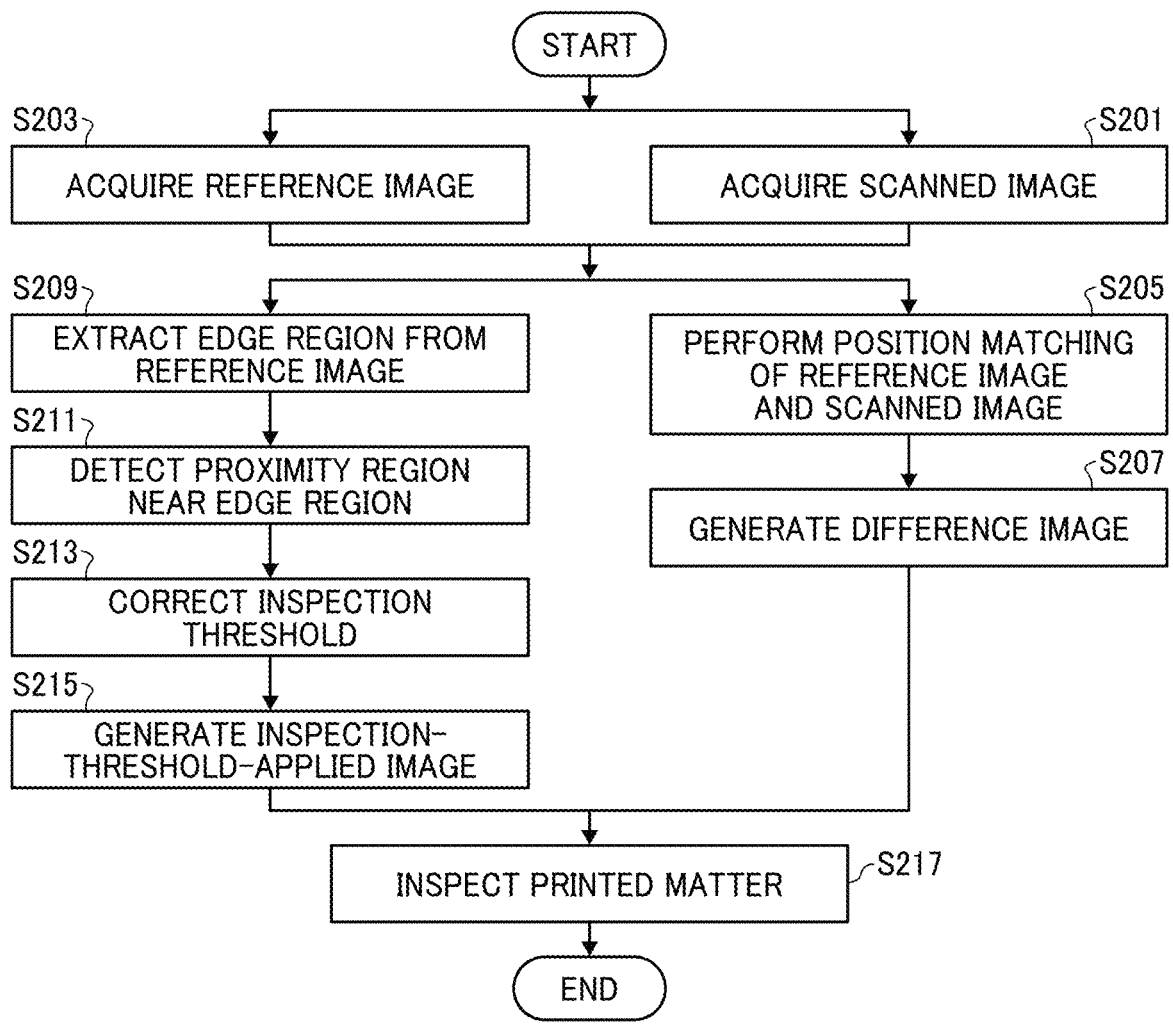
FIG. 8 illustrates an example of a flowchart of the steps of a process of inspecting a printed image by the print inspection apparatus of the embodiment.

FIG. 8 illustrates an example of a flowchart of the steps of a process of inspecting a printed image by the print inspection apparatus 200 of the embodiment.

First, the scanned-image acquisition unit 253 acquires a scanned image generated by the scan unit 251 (step S201).

Further, the reference image acquisition unit 255 acquires the reference image as the inspection reference of the printed matter generated by the printing apparatus 100 (step S203).

The sequential order of steps S201 and S203 can be from steps S201 to S203, from steps S203 to S201, or in parallel.

Then, the difference image generation unit 257 performs the position matching or alignment of the reference image and the scanned image (step S205), and generates a difference image indicating a difference between the reference image and the scanned image pixel by pixel after performing the position matching (step S207).

Then, the edge region extraction unit 259 extracts an edge region from the reference image (step S209).

Then, the proximity region detection unit 261 detects a proximity region located near the edge region (step S211).

Then, the threshold correction unit 265 corrects the one or more inspection thresholds stored in the inspection threshold storage 263 to apply the corrected inspection thresholds to the pixels defining the proximity region or the pixels defining the edge region (step S213). Specifically, an inspection threshold to be applied to one pixel defining the edge region is corrected based on the density difference between the one pixel defining the edge region and each one of influencing pixels set in the proximity region, and the distance between the one pixel defining the edge region and each one of the influencing pixels set in the proximity region. Further, an inspection threshold to be applied to one pixel defining the proximity region is corrected based on the density difference between the one pixel defining the proximity region and each one of influencing pixels set in the edge region, and the distance between the one pixel defining the proximity region and each one of the influencing pixels set in the edge region. Then, the inspection-threshold-applied image generation unit 267 applies the pre-set inspection threshold stored in the inspection threshold storage 263 to the pixels defining the region other than the edge region and the proximity region, and applies the inspection threshold corrected by the threshold correction unit 265 (i.e., corrected inspection threshold) to the pixels defining the edge region and the pixels defining the proximity region to generate the inspection-threshold-applied image (step S215).

The sequential order of steps S205 to S207 and S209 to S215 can be from steps S205 to S207 and then from steps S209 to S215, from steps S209 to S215 and then from steps S205 to S207, or in parallel.

Then, the inspection unit 269 compares the difference image and the inspection-threshold-applied image pixel by pixel to inspect the printed matter (step S217).

In the above described embodiment, the inspection threshold is corrected based on the density and the distance calculated for the edge region and the proximity region, with which the inspection threshold can be adjusted (i.e., set smaller or greater) based on a state of the proximity region and the edge region, with which the inspection accuracy at the edge region and the proximity region surrounding the edge region can be enhanced.

In the above described embodiment, the inspection threshold is corrected based on the density and the distance calculated for the edge region and the proximity region. Therefore, compared to conventional techniques that require printing the same contents for a number of recording sheets, the above described embodiment is not required to print the same contents for a number of recording sheets, and thereby the above described embodiment is suitable for inspecting printed matters produced in a certain printing environment such as a variable printing environment that prints the same contents for a smaller number.

Therefore, in the above described embodiment of the inspection apparatus, the inspection method, and the storage medium, the inspection accuracy near the edge region can be enhanced under any printing environment.

Variant Example

Alternatively, the above described method of correcting the inspection threshold can be performed by using another method. For example, the inspection threshold can be corrected by applying a filtering process on the reference image. In this case, the threshold correction unit 265 corrects the inspection threshold for one pixel defining the edge region or one pixel defining the proximity region by setting the one pixel defining the edge region or the one pixel defining the proximity region as the center pixel, and filtering the one pixel and other pixels defining the edge region or the one pixel and other pixels defining the proximity region, in which the other pixels in the edge region or the other pixels in the proximity region are used as referred pixels.

The filtering is performed by setting a size of a filter based on a size of the proximity region. For example, if a region defined by pixels located within a two-pixel range from the edge region 401 is set as the proximity region 402, the size of the filter can be set 5×5 pixels. As to the pixels covered by the filter, the filtering is applied to the pixels defining the edge region or the pixels defining the proximity region alone while the filtering is not applied to pixels not defining the edge region or the proximity region. This is because the inspection threshold is to be corrected based on factors related to the edge portion while eliminating factors related to a non-edge pattern such as a picture pattern. Although the variant example assumes that a filter coefficient is empirically determined, a method for determining the filter coefficient is not limited thereto. Program:

One or more programs executed by the print inspection apparatus in the above described embodiment and variant example can be stored in a computer-readable storage medium such as compact disk read only memory (CD-ROM), compact disk recordable (CD-R), memory card, digital versatile disk (DVD), flexible disk (FD), or the like with an installable or executable format.

Further, the one or more programs executed by the print inspection apparatus in the above described embodiment and variant example can be stored in a computer connected to a network such as the Internet, and provided by downloading from the computer via the network. Further, the one or more programs executed by the print inspection apparatus in each of the above embodiment and variant example can be provided or distributed through the network such as the Internet. Further, the one or more programs executed by the print inspection apparatus in the above embodiment and the variant example can be provided in a read only memory (ROM) or the like in advance.

Further, the one or more programs executed by the print inspection apparatus in the above embodiment and variant example can be implemented as one or more modules to implement the above-described each unit on the computer. In the actual hardware configuration, for example, the CPU reads the one or more programs from the ROM and loads on the RAM to execute the one or more programs to implement the above described functions on the computer. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In the above described one embodiment, the inspection apparatus includes the following configurations. For example, the inspection apparatus includes circuitry to acquire a reference image used as a reference for inspecting a printed matter; acquire a scanned image by scanning the printed matter; generate a difference image indicating a difference between the acquired reference image and the acquired scanned image based on the acquired reference image and the acquired scanned image; extract an edge region from the acquired reference image; detect a proximity region located near the extracted edge region; correct an inspection threshold to a corrected inspection threshold to be applied to a pixel defining the extracted edge region, and an inspection threshold to a corrected inspection threshold to be applied to a pixel defining the detected proximity region, the corrected inspection threshold to be applied to the pixel defining the edge region is calculated based on a density difference between the pixel defining the edge region and each one of influencing pixels set in the proximity region, and a distance between the pixel defining the edge region and each one of the influencing pixels set in the proximity region, and the corrected inspection threshold to be applied to the pixel defining the proximity region is calculated based on a density difference between the pixel defining the proximity region and each one of influencing pixels set in the edge region, and a distance between the pixel defining the proximity region and each one of the influencing pixels set in the edge region; and inspect the printed matter based on the generated difference image and the corrected inspection threshold.

Further, as to the inspection apparatus of the above described one embodiment, the circuitry detects the proximity region based on one or more pixels defining the edge region, and each one of the influencing pixels set in the edge region opposite to the pixel defining the proximity region is one of pixels adjacent to a pixel defining the edge region and used as a source of detecting the pixel defining the proximity region, and each one of the influencing pixel in the edge region is set at a respective position opposite to a position of the pixel defining the proximity region.

Further, as to the inspection apparatus of the above described one embodiment, each one of the influencing pixels set in the proximity region opposite to the pixel defining the edge region is one of pixels in the proximity region that is adjacent to one or more pixels defining the edge region, and each one of the influencing pixels set in the proximity region has the greatest density difference with respect to the pixel defining the edge region.

Further, as to the inspection apparatus of the above described one embodiment, the corrected inspection threshold to be applied to the pixel defining the edge region is proportional to the density difference between the pixel defining the edge region and each one of the influencing pixels set in the proximity region, and inversely proportional to the distance between the pixel defining the edge region and each one of the influencing pixels set in the proximity region, and the corrected inspection threshold to be applied to the pixel defining the proximity region is proportional to the density difference between the pixel defining the proximity region and each one of the influencing pixels set in the edge region, and inversely proportional to the distance between the pixel defining the proximity region and each one of the influencing pixels set in the edge region.

Further, as to the inspection apparatus of the above described one embodiment, the circuitry applies pre-set inspection threshold to one or more pixels defining a region other than the edge region and the proximity region, and applies the corrected inspection threshold to one or more pixels defining the edge region and one or more pixels defining the proximity region to generate an inspection-threshold-applied image, and wherein the circuitry inspects the printed matter based on the difference image and the inspection-threshold-applied image.

Further, as to the inspection apparatus of the above described one embodiment, the method of inspecting a printed image includes acquiring a reference image used as a reference for inspecting a printed matter; acquiring a scanned image by scanning the printed matter; generating a difference image indicating a difference between the acquired reference image and the acquired scanned image based on the acquired reference image and the acquired scanned image; extracting an edge region from the acquired reference image; detecting a proximity region located near the extracted edge region; correcting an inspection threshold to a corrected inspection threshold to be applied to a pixel defining the extracted edge region, and an inspection threshold to a corrected inspection threshold to be applied to a pixel defining the detected proximity region, the corrected inspection threshold to be applied to the pixel defining the edge region is calculated based on a density difference between the pixel defining the edge region and each one of influencing pixels set in the proximity region, and a distance between the pixel defining the edge region and each one of the influencing pixels set in the proximity region, and the corrected inspection threshold to be applied to the pixel defining the proximity region is calculated based on a density difference between the pixel defining the proximity region and each one of influencing pixels set in the edge region, and a distance between the pixel defining the proximity region and each one of the influencing pixels set in the edge region; and inspecting the printed matter based on the generated difference image and the corrected inspection threshold.

Further, as to the inspection apparatus of the above described one embodiment, a non-transitory storage medium storing one or more instructions that, when executed by one or more processors, cause the one or more processors to execute a method of inspecting a printed image. The method includes acquiring a reference image used as a reference for inspecting a printed matter; acquiring a scanned image by scanning the printed matter; generating a difference image indicating a difference between the acquired reference image and the acquired scanned image based on the acquired reference image and the acquired scanned image; extracting an edge region from the acquired reference image; detecting a proximity region located near the extracted edge region; correcting an inspection threshold to a corrected inspection threshold to be applied to a pixel defining the extracted edge region, and an inspection threshold to a corrected inspection threshold to be applied to a pixel defining the detected proximity region, the corrected inspection threshold to be applied to the pixel defining the edge region is calculated based on a density difference between the pixel defining the edge region and each one of influencing pixels set in the proximity region, and a distance between the pixel defining the edge region and each one of the influencing pixels set in the proximity region, and the corrected inspection threshold to be applied to the pixel defining the proximity region is calculated based on a density difference between the pixel defining the proximity region and each one of influencing pixels set in the edge region, and a distance between the pixel defining the proximity region and each one of the influencing pixels set in the edge region; and inspecting the printed matter based on the generated difference image and the corrected inspection threshold.

As to the above described another embodiment, the inspection apparatus includes circuitry to acquire a reference image used as a reference for inspecting a printed matter; acquire a scanned image by scanning the printed matter; generate a difference image indicating a difference between the acquired reference image and the acquired scanned image based on the acquired reference image and the acquired scanned image; extract an edge region from the acquired reference image; detect a proximity region located near the extracted edge region; perform a filtering process on a pixel defining the extracted edge region, other pixel defining the extracted edge region and one or more pixels defining the detected proximity region located near the pixel defining the extracted edge region by setting the pixel defining the extracted edge region as the center pixel for the filtering process; perform a filtering process on a pixel defining the detected proximity region, and other pixel defining the detected proximity region and one or more pixels defining the extracted edge region located near the pixel defining the detected proximity region by setting the pixel defining the detected proximity region as the center pixel for the filtering process; correct an inspection threshold to be applied to the pixel defining the edge region based on the filtering process performed on the pixel defining the extracted edge region, and the other pixel defining the extracted edge region and the one or more pixels defining the detected proximity region located near the pixel defining the extracted edge region; correct an inspection threshold to be applied to the pixel defining the proximity region based on the filtering process performed on the pixel defining the detected proximity region, and the other pixel defining the detected proximity region and the one or more pixels defining the extracted edge region located near the pixel defining the detected proximity region; and inspect the printed matter based on the generated difference image and the corrected inspection threshold.

As to the above described another embodiment, the inspection system includes the image forming apparatus to generate a printed matter; and the inspection apparatus to inspect the printed matter generated by the image forming apparatus. The inspection apparatus includes circuitry to acquire a reference image used as a reference for inspecting the printed matter; acquire a scanned image by scanning the printed matter; generate a difference image indicating a difference between the acquired reference image and the acquired scanned image based on the acquired reference image and the acquired scanned image; extract an edge region from the acquired reference image; detect a proximity region located near the extracted edge region; correct an inspection threshold to a corrected inspection threshold to be applied to a pixel defining the extracted edge region, and an inspection threshold to a corrected inspection threshold to be applied to a pixel defining the detected proximity region, the corrected inspection threshold to be applied to the pixel defining the edge region is calculated based on a density difference between the pixel defining the edge region and each one of influencing pixels set in the proximity region, and a distance between the pixel defining the edge region and each one of the influencing pixels set in the proximity region, and the corrected inspection threshold to be applied to the pixel defining the proximity region is calculated based on a density difference between the pixel defining the proximity region and each one of influencing pixels set in the edge region, and a distance between the pixel defining the proximity region and each one of the influencing pixels set in the edge region; and inspect the printed matter based on the generated difference image and the corrected inspection threshold.

The above described embodiment and variant example are described as just examples, and are not intended to limit the scope of the invention. The above described embodiment and variant example can be modified variously, and can be implemented in a variety of other forms such as various omissions, substitutions, changes, and a partially cloud computing within a range that does not deviate from the gist of the present invention. These embodiments are included in the scope and gist of the present invention, and are included within the scope of the claims and their equivalents.

Numerous additional modifications and variations of the above embodiments and the variant examples are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of present disclosure and appended claims.

What is claimed is:
1. An inspection apparatus, comprising:
circuitry configured to
  acquire a reference image used as a reference for inspecting a printed matter;
  acquire a scanned image by scanning the printed matter;
  generate a difference image indicating a difference between the acquired reference image and the acquired scanned image based on the acquired reference image and the acquired scanned image;
  extract an edge region from the acquired reference image;
  detect a proximity region having pixels located within a pixel range surrounding the extracted edge region in the acquired reference image;
  correct an inspection threshold to a corrected first inspection threshold to be applied to a pixel in the extracted edge region, and correct the inspection threshold to a second corrected inspection threshold to be applied to a pixel in the detected proximity region, wherein
    the first corrected inspection threshold to be applied to the pixel in the edge region is calculated based on (1) density differences between the pixel in the edge region and each one of proximity influencing pixels set in the proximity region, respectively, and (2) distances between the pixel in the edge region and each one of the proximity influencing pixels set in the proximity region, respectively, and
    the second corrected inspection threshold to be applied to the pixel in the proximity region is calculated based on (1) density differences between the pixel in the proximity region and each one of edge influencing pixels set in the edge region, respectively, and (2) distances between the pixel in the proximity region and each one of the edge influencing pixels set in the edge region, respectively; and inspect the printed matter based on the generated difference image and the corrected first and second inspection thresholds.

2. The inspection apparatus of claim 1,
wherein the circuitry is further configured to detect the proximity region based on one or more pixels defining the edge region,
wherein each one of the edge influencing pixels set in the edge region opposite to the pixel in the proximity region is one of pixels adjacent to a pixel in the edge region and used as a source of detecting the pixel in the proximity region, and each one of the edge influencing pixel in the edge region is set at a respective position opposite to a position of the pixel in the proximity region.

3. The inspection apparatus of claim 1,
wherein each one of the proximity influencing pixels set in the proximity region opposite to the pixel in the edge region is one of pixels in the proximity region that is adjacent to one or more pixels in the edge region, and each one of the proximity influencing pixels set in the proximity region has a greatest density difference with respect to the pixel in the edge region.

4. The inspection apparatus of claim 1,
wherein the first corrected inspection threshold to be applied to the pixel in the edge region is proportional to the density differences between the pixel in the edge region and each one of the proximity influencing pixels set in the proximity region, and inversely proportional to the distances between the pixel in the edge region and each one of the proximity influencing pixels set in the proximity region,
wherein the second corrected inspection threshold to be applied to the pixel in the proximity region is proportional to the density differences between the pixel in the proximity region and each one of the edge influencing pixels set in the edge region, and inversely proportional to the distances between the pixel in the proximity region and each one of the edge influencing pixels set in the edge region.

5. The inspection apparatus of claim 1,
wherein the circuitry is further configured to apply a pre-set inspection threshold to one or more pixels defining a region other than the edge region and the proximity region, and apply the first corrected inspection threshold to the pixel in the edge region and apply the second corrected inspection threshold to the pixel in the proximity region to generate an inspection-threshold-applied image,
wherein the circuitry is further configured to inspect the printed matter based on the difference image and the inspection-threshold-applied image.

6. A method of inspecting a printed image, comprising:
acquiring a reference image used as a reference for inspecting a printed matter;
acquiring a scanned image by scanning the printed matter;
generating a difference image indicating a difference between the acquired reference image and the acquired scanned image based on the acquired reference image and the acquired scanned image;
extracting an edge region from the acquired reference image;
detecting a proximity region having pixels located within a pixel range surrounding the extracted edge region in the acquired reference image;
correcting an inspection threshold to a corrected first inspection threshold to be applied to a pixel in the extracted edge region, and correct the inspection threshold to a second corrected inspection threshold to be applied to a pixel in the detected proximity region, wherein
the first corrected inspection threshold to be applied to the pixel in the edge region is calculated based on (1) density differences between the pixel in the edge region and each one of proximity influencing pixels set in the proximity region, respectively, and (2) distances between the pixel in the edge region and each one of the proximity influencing pixels set in the proximity region, respectively, and
the second corrected inspection threshold to be applied to the pixel in the proximity region is calculated based on (1) density differences between the pixel in the proximity region and each one of edge influencing pixels set in the edge region, respectively, and (2) distances between the pixel in the proximity region and each one of the edge influencing pixels set in the edge region, respectively; and
inspecting the printed matter based on the generated difference image and the first and second corrected inspection thresholds.

7. A non-transitory storage medium storing one or more instructions that, when executed by one or more processors, cause the one or more processors to execute a method of inspecting a printed image, the method comprising:
acquiring a reference image used as a reference for inspecting a printed matter;
acquiring a scanned image by scanning the printed matter;
generating a difference image indicating a difference between the acquired reference image and the acquired scanned image based on the acquired reference image and the acquired scanned image;
extracting an edge region from the acquired reference image;
detecting a proximity region having pixels located within a pixel range surrounding the extracted edge region in the acquired reference image;
correcting an inspection threshold to a corrected first inspection threshold to be applied to a pixel in the extracted edge region, and correct the inspection threshold to a second corrected inspection threshold to be applied to a pixel in the detected proximity region, wherein
the first corrected inspection threshold to be applied to the pixel in the edge region is calculated based on (1) density differences between the pixel in the edge region and each one of proximity influencing pixels set in the proximity region, respectively, and (2) distances between the pixel in the edge region and each one of the proximity influencing pixels set in the proximity region, respectively, and
the second corrected inspection threshold to be applied to the pixel in the proximity region is calculated based on (1) density differences between the pixel in the proximity region and each one of edge influencing pixels set in the edge region, respectively, and (2) distances between the pixel in the proximity region and each one of the edge influencing pixels set in the edge region, respectively; and
inspecting the printed matter based on the generated difference image and the first and second corrected inspection thresholds.

8. The inspection apparatus of claim 1, wherein the circuitry is further configured to correct the inspection threshold to obtain corresponding corrected inspection thresholds for each pixel in the extracted edge region and each pixel in the detected proximity region.

* * * * *